(12) United States Patent
Wong

(10) Patent No.: US 7,472,303 B1
(45) Date of Patent: *Dec. 30, 2008

(54) INFORMATION PRESERVATION ON A PORTABLE ELECTRONIC DEVICE

(75) Inventor: Yoon Kean Wong, Menlo Park, CA (US)

(73) Assignee: Palm, Inc., Sunnyvale, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 11/581,168

(22) Filed: Oct. 13, 2006

Related U.S. Application Data

(63) Continuation of application No. 09/970,465, filed on Oct. 3, 2001, now Pat. No. 7,225,353.

(51) Int. Cl.
*G06F 13/14* (2006.01)
*H04Q 7/32* (2006.01)

(52) U.S. Cl. .................. 713/340; 713/300; 713/310; 713/320; 713/321; 713/322; 713/323; 713/324; 713/330

(58) Field of Classification Search .................. 713/300, 713/310, 320–324, 330, 340
See application file for complete search history.

(56) References Cited

U.S. PATENT DOCUMENTS

| | | | |
|---|---|---|---|
| 4,737,702 A | | 4/1988 | Koenck |
| 5,032,825 A | | 7/1991 | Kuznicki |
| 5,182,769 A | * | 1/1993 | Yamaguchi et al. .... 379/395.01 |
| 5,349,668 A | * | 9/1994 | Gladstein et al. ............ 713/340 |
| 5,519,871 A | * | 5/1996 | Shimoda ..................... 713/300 |
| 5,592,095 A | | 1/1997 | Meadows |
| 5,625,237 A | | 4/1997 | Saeki et al. |
| 5,631,850 A | | 5/1997 | Tanaka et al. |
| 5,710,931 A | * | 1/1998 | Nakamura et al. .......... 713/323 |
| 5,717,936 A | * | 2/1998 | Uskali ....................... 713/340 |
| 5,757,895 A | | 5/1998 | Aridas et al. |
| 5,898,930 A | | 4/1999 | Terashima et al. |
| 5,915,118 A | | 6/1999 | Migita |
| 5,920,728 A | | 7/1999 | Hallowell et al. |
| 5,978,922 A | * | 11/1999 | Arai et al. .................... 713/323 |
| 6,020,718 A | * | 2/2000 | Ozawa et al. ............... 320/116 |
| 6,029,074 A | | 2/2000 | Irvin |
| 6,052,565 A | | 4/2000 | Ishikura et al. |
| 6,230,032 B1 | | 5/2001 | Liljegren |
| 6,313,606 B1 | | 11/2001 | Eguchi |
| 6,314,307 B1 | | 11/2001 | Charron |
| 6,389,556 B1 | | 5/2002 | Qureshi |
| 6,425,087 B1 | | 7/2002 | Osborn et al. |
| 6,463,307 B1 | | 10/2002 | Larsson et al. |
| 6,501,968 B1 | | 12/2002 | Ichimura |
| 6,643,786 B1 | | 11/2003 | Kawakami |
| 6,735,624 B1 | * | 5/2004 | Rubin et al. ................. 709/219 |
| 6,787,938 B1 | | 9/2004 | McClure et al. |
| 6,810,292 B1 | | 10/2004 | Rappernecker et al. |

(Continued)

*Primary Examiner*—Abdelmoniem Elamin

(57) ABSTRACT

A system and method for information preservation on a portable electronic device. A signal indicating an energy capacity threshold remaining in the battery of a hand held device may be generated. Then, responsive to such a signal, information may be copied from a volatile memory into a non-volatile memory. The non-volatile memory may be configured to provide instructions for direct execution by a processor, or the non-volatile storage may be attached via an expansion interface. The non-volatile memory may be a removable card. The copy function is typically done in low power modes. Alternatively, the information is only copied provided sufficient battery capacity remains to perform the copy function.

25 Claims, 3 Drawing Sheets

U.S. PATENT DOCUMENTS 6,848,014 B2    1/2005  Landron et al.
6,996,733 B2 *  2/2006  Hershenson et al. ........ 713/340
7,200,634 B2 *  4/2007  Mendiola et al. ............ 709/204
7,200,817 B2 *  4/2007  Dove et al. .................. 715/762

* cited by examiner

INFORMATION PRESERVATION ON A PORTABLE ELECTRONIC DEVICE

RELATED APPLICATIONS

The present application is a continuation of and claims the benefit of U.S. patent application Ser. No. 09/970,465, filed Oct. 3, 2001, now U.S. Pat. No. 7,225,353, entitled "INFORMATION PRESERVATION ON A PORTABLE ELECTRONIC DEVICE," naming Yoon Kean Wong as the inventor, assigned to the assignee of the present invention. That application is incorporated herein by reference in its entirety and for all purposes.

FIELD OF THE INVENTION

Embodiments of the present invention relate to hand held computer systems. More particularly, embodiments of the present invention provide a method and apparatus for saving information in non-volatile storage in response to a power level reaching a predetermined low threshold.

BACKGROUND

In portable electronic devices, information is often stored in volatile memory, for example random access memory or RAM. This type of memory can operate, that is information can be written or stored into RAM, and read out of RAM, at rates substantially similar to the rate at which a processor is operating. A drawback of RAM is that in general it requires electrical power to not only operate, but also to maintain information. In other words, if power is removed from the RAM device, it will loose all information stored within.

As an unfortunate consequence, in a battery operated device, when the energy from the device's battery has been consumed, the information stored in RAM may be lost. In most cases the information created and collected by the user and stored in the device is much more valuable than the device itself. Obviously, losing such information would limit the commercial viability of such products.

There have been numerous prior art attempts to overcome this problem. One prior art method uses a back-up battery that provides energy only for the limited function of maintaining the contents of RAM while the main battery is being replaced or recharged.

Another prior art method uses a "lock out" mechanism to reserve a portion of energy in a main battery for the sole purpose of maintaining the contents of RAM. In this mode, after a threshold level has been reached, e.g., 90% of the battery's energy has been expended, the user can no longer initiate operation of the device. The remaining 10% of the energy is used solely to maintain the contents of RAM. After the final 10% is consumed, RAM contents are lost.

Yet another prior art method combines the aforementioned "lock out" with a super capacitor. During the lock out mode, the dead battery may be removed and replaced with a fresh cell. The super capacitor is capable of supplying enough energy to maintain the contents of RAM for perhaps one minute, which should be sufficient time to replace the battery.

Unfortunately, the methods discussed above, all suffer from the same fundamental drawback, that is, maintaining the contents of RAM still consumes power, and there is only a limited amount of power available in the device. If the user does not replenish the energy (replace or recharge the battery) before the "lock out" reserve or the back up battery or the super cap runs out, the information is still lost.

SUMMARY OF THE INVENTION

Therefore, it would be advantageous to provide a method and system providing for the storage of information without consuming power. A further need exists for a hand held computer system that will automatically copy information from RAM to non-volatile memory when the battery is low. A still further need exists for a system and method for recovering information from non-volatile memory after sufficient energy has been restored to enable full operation of the device.

Embodiments of the present invention provide for the storage of information without power. Further, embodiments of the present invention provide for a hand held computer system that will automatically copy information from RAM to non-volatile memory when the battery is low. Yet other embodiments of the present invention provide for a system and method of recovering information from non-volatile memory after sufficient energy has been restored to enable full operation of the device.

More specifically, a system and method for information preservation on a portable electronic device are disclosed. First, a signal may be generated that indicates an energy capacity remaining in the battery of a hand held. Then, responsive to such a signal, information from a volatile memory space may be automatically stored into non-volatile storage.

Another embodiment of the present invention provides for suspending user-initiated operation of a hand held device at a first energy capacity. The system may then maintain information in volatile memory until a second energy capacity is reached. Then, the system may store information into non-volatile storage.

In one embodiment of the present invention, the non-volatile storage is configured to be capable of storing instructions for the processor of the hand held device.

In another embodiment of the present invention, the non-volatile storage is connected to the system via an expansion interface.

In yet another embodiment of the present invention, the system reserves an amount of storage in non-volatile storage.

In still another embodiment of the present invention, the system dynamically adjusts the reserves of non-volatile storage.

DETAILED DESCRIPTION OF THE INVENTION

Figure 1:
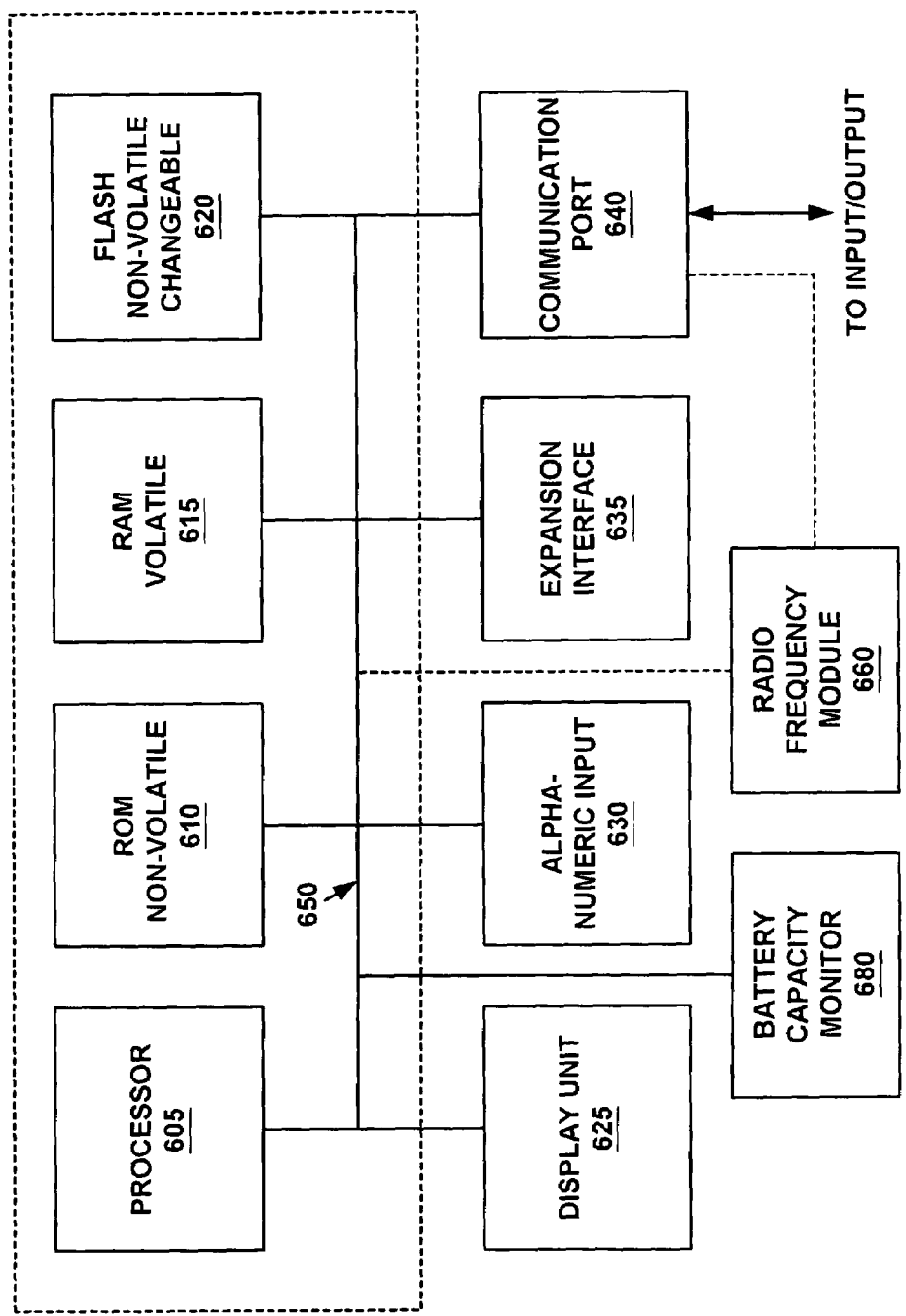
FIG. 1 is a block diagram of a computer system, which may be used as a platform to implement embodiments of the present invention.

In the following detailed description of the present invention, information preservation on a portable electronic device, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

NOTATION AND NOMENCLATURE

Some portions of the detailed descriptions which follow (e.g., processes 200 and 300) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Information Preservation on a Portable Electronic Device

An embodiment of the present invention is described in the context of a hand held computer system. However, it is appreciated that the present invention may be utilized in other types of battery powered electronic devices where it may be desirable to preserve information when a battery is removed or "dead."

FIG. 1 is a block diagram of a computer system, which may be used as a platform to implement embodiments of the present invention. Computer system 100 includes an address/data bus 650 for communicating information, a central processor 605 functionally coupled with the bus for processing information and instructions and a volatile memory 615 (e.g., random access memory RAM) coupled with the bus 650 for storing information and instructions for the central processor 605.

Information can be both read from and written to RAM 615 at data rates comparable to processor 605. Volatile memory 615 may be used to store two general types of information, permanent information and temporary or "dynamic" information.

Permanent information may include user generated information, such as appointments and address book entries, as well as information downloaded from other computers or otherwise collected by the user, such as stock price quotes or game programs. Such permanent information generally is of long term value. System 100 manages volatile memory 615 in such a manner that such permanent information may be retained as long as power is supplied to volatile memory 615.

Volatile memory 615 may also be used by processor 605 to store information and instructions that are valuable for a much shorter period of time. Examples include data structures used by programs and the operating system such as a stack or heap, and storage for interim calculations. Another example may be the frame buffer for a display 625.

In general, the user is much more aware of permanent information (e.g., an address book entry) than dynamic information (a parameter passed to a subroutine on a stack data structure). It is appreciated that this is an exemplary, rather than definitive distinction.

However, volatile memory 615 does not maintain information without power applied. Consequently, some form of non-volatile memory must be included in system 100.

Still referring to FIG. 1, computer system 100 may include a non-volatile memory 610 (e.g., read only memory ROM) coupled with the bus 650 for storing static information and instructions for the processor 605.

Computer system 100 also optionally includes a writeable, non-volatile memory 620 (e.g., flash electrically erasable programmable read only memory) for storing information and instructions for the central processor 605 which can be updated after the manufacture of system 100. Non-volatile memory 620 can maintain information without power applied.

Information can generally be read from writeable, non-volatile memory 620 directly by the processor. However, storing information to writeable, non-volatile memory 620 is substantially slower, up to four to six orders of magnitude slower, than reading. Further, the act of storing information to writeable, non-volatile memory 620 also requires greater power than storing information to RAM 615.

Consequently, even though writeable, non-volatile memory 620 can retain information without power, it does not substitute for RAM 615 in the normal operation of system 100.

Computer system 100 also optionally includes an expansion interface 635 coupled with the bus 650. Expansion interface 635 can implement many well known standard expansion interfaces, including without limitation the Secure Digital card interface, universal serial bus (USB) interface, Compact Flash, Personal Computer (PC) Card interface, CardBus, Peripheral Component Interconnect (PCI) interface, mini-PCI interface, IEEE 1394, Small Computer System Interface (SCSI), Personal Computer Memory Card International Association (PCMCIA) interface, Industry Standard Architecture (ISA) interface, or RS-232 interface. It is appreciated that external interface 635 may also implement other well known or proprietary interfaces.

A wide variety of well known expansion devices may be attached to computer system 100 via expansion interface 635. Examples of such devices include without limitation rotating magnetic memory devices, flash memory devices, digital cameras, wireless communication modules, digital audio players and Global Positioning System (GPS) devices.

System 100 also optionally includes a communication port 640. Communication port 640 may be implemented as part of expansion interface 635. When implemented as a separate interface, communication port 640 may typically be used to exchange information with other devices via communication-oriented data transfer protocols. Examples of communication ports include without limitation RS-232 ports, universal asynchronous receiver transmitters (UARTs), USB ports, infrared light transceivers, ethernet ports, IEEE 1394 and synchronous ports.

In general, expansion interface 635 has more signal lines and operates at higher data rates than communication port 640. Conversely, communication port 640 generally is able to communicate over greater distances than expansion interface 635. It is appreciated, however, that that there can be a great deal of overlap in the type of interface and functions assigned to expansion interface 635 and communication port 640, in accordance with embodiments of the present invention.

System 100 optionally includes a radio frequency module 660, which may implement a mobile telephone, a pager, or a digital data link. Radio frequency module 660 may be interfaced directly to bus 650, via communication port 640 or via expansion interface 635.

Also included in computer system 100 of FIG. 1 is an optional alphanumeric input device 630. Device 630 can communicate information and command selections to the central processor 600. Device 630 may take the form of a touch sensitive digitizer panel.

The optional display unit 625 utilized with the computer system 100 may be a liquid crystal display (LCD) device, cathode ray tube (CRT), field emission device (FED, also called flat panel CRT), light emitting diode (LED), plasma display device, electro-luminescent display, electronic paper or other display device suitable for creating graphic images and alphanumeric characters recognizable to the user.

Referring to FIG. 1, computer system 100 also includes battery capacity monitor 680. Battery capacity monitor 680 serves to measure the amount of power remaining in the system's battery (not shown). There are a variety of well known devices and techniques to measure battery power, for example analog to digital converters to measure voltage and "coulomb counters" which measure actual energy delivered by the battery.

In an embodiment of the present invention, battery capacity monitor 680 may signal processor 605 that a pre-determined amount of energy remains in the battery. This signal may indicate a "low battery" condition. This amount may be the minimum energy required to perform a storage operation.

Responsive to this signal, processor 605 may cause information to be copied from volatile RAM 615 into a non-volatile computer readable storage medium, which could be non-volatile writeable (flash) memory 620, or non-volatile storage connected to expansion interface 635, for example, a Secure Digital card containing flash memory.

It is appreciated that other types of non-volatile storage could be connected to expansion interface 635, including for example battery backed up RAM and rotating magnetic disks.

In an embodiment of the present invention, battery capacity monitor 680 of FIG. 1 may generate a signal based on the remaining battery capacity being just sufficient to copy information from RAM 615 to non-volatile storage.

Most hand held computer systems suspend their operation as a frequent, regular operation, for example when the device turns "off," either in response to the user pressing the power button or as a result of timing out. As a result, the operations, data structures and application programs of such devices are oriented toward restoring an operating state from a suspended state. Consequently, a given operating state may generally be reconstructed without having to save the processor state and all memory contents.

In contrast, to suspend the typical desk top computer (and portable computers based off of their design), it is necessary to save substantially all volatile information, including the processor register values and the entire contents of RAM.

In an embodiment of the present invention, only the permanent information, described previously, may be stored into non-volatile storage. This is sufficient information to restore operation of the hand held device without loss of valuable information.

In another embodiment of the present invention, the battery capacity monitor 680 may be configured so that it generates a signal whenever less than an energy capacity is present. Consequently, when a battery is removed—the energy capacity is zero—the signal is generated.

In another embodiment of the present invention, battery capacity monitor 680 of FIG. 1 may generate a first signal that a pre-determined amount of energy remains in the battery. Responsive to this first signal, the hand held system 100 may automatically enter a "lock out" mode of operation, in which user-initiated operation is prevented (e.g., the system 100 is unresponsive to user attempts to use it, e.g., pushing buttons) and volatile RAM may be placed in a low power, data retention mode.

While in this lock out mode, the system continues to consume energy from its battery. Eventually, battery capacity monitor 680 may signal processor 605 that a pre-determined amount of energy remains in the battery.

Responsive to this signal, processor 605 may cause critical information to be copied from volatile RAM 615 into a non-volatile computer readable storage medium, which could be non-volatile writeable (flash) memory 620, or non-volatile storage connected to expansion interface 635, for example a Secure Digital card containing flash memory.

In an embodiment of the present invention, the system may reserve a portion of non-volatile storage, which could be non-volatile writeable (flash) memory 620, or non-volatile storage connected to expansion interface 635, during normal operation in order to ensure that such storage is available if it is needed for later use by other elements of the present invention.

In another embodiment of the present invention, the amount of non-volatile storage reserved may be adjusted as the amount of permanent information increases and decreases.

In an embodiment of the present invention, an indicator flag may be stored in non-volatile storage in order to indicate that the device has stored information in non-volatile storage as a result of a low battery condition. After energy has been added to the system (for example, by recharging or replacing a battery) the system will check for this indicator flag. If the indicator flag is detected, the information previously stored in non-volatile memory will be restored into operating memory, for example RAM 615.

Another embodiment of the present invention provides for clearing the indicator flag after the restoration is complete.

Figure 2:
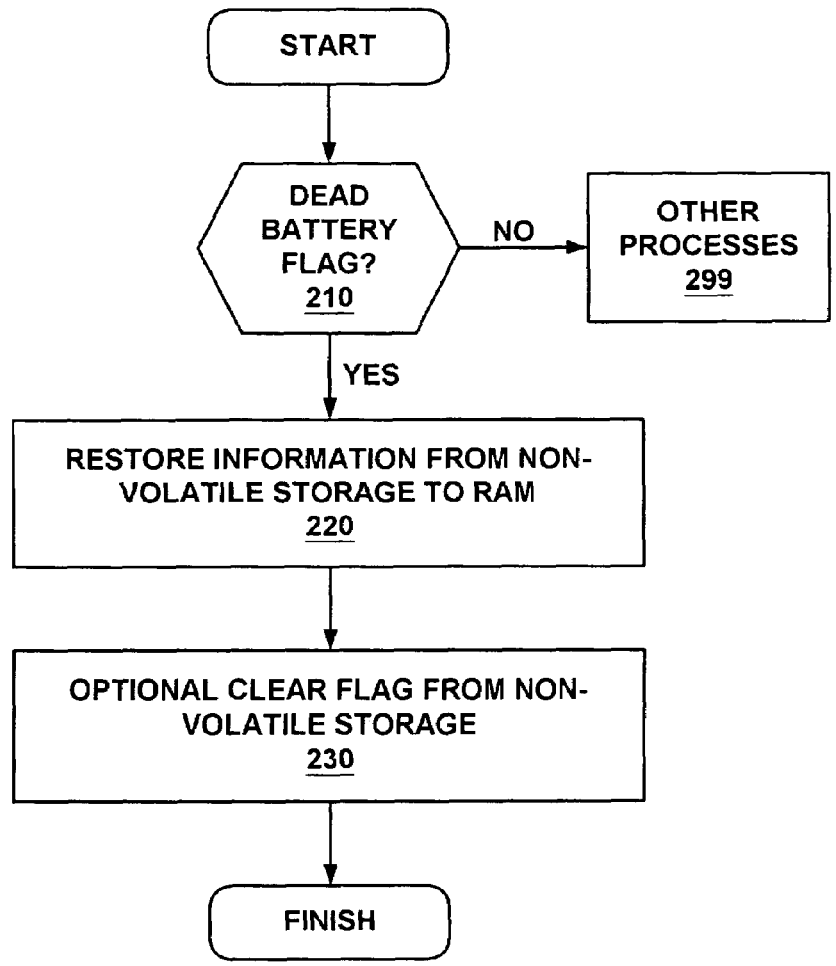
FIG. 2 is a flow diagram depicting a process 200 for restoring information from non-volatile storage to volatile storage, according to an embodiment of the present invention.

FIG. 2 is a flow diagram depicting a process 200 for restoring information from non-volatile storage to volatile storage, according to an embodiment of the present invention.

Process 200 may be entered as a result of a power on reset signal generated by battery capacity monitor 680 or other elements of a power supply (not shown). The power on reset signal indicates that sufficient energy is in the system to begin normal operation. It is appreciated that other signals may also initiate process 200.

In step 210, a location in non-volatile storage (flash 620 or non-volatile storage attached to expansion interface 635) is checked for a flag which may indicate that information was stored in non-volatile storage in response to a "dead battery" signal.

If such a flag is not detected, control is transferred to other processes 299, which may continue with a power on reset cycle, for example.

If the dead battery flag is detected, process step 220 may copy information from non-volatile storage to RAM 615. This operation may restore sufficient information such that a previous loss of power had little or no effect on valuable user generated or collected information.

After information has been successfully restored, optional step 230 may clear the dead battery indicator flag from non-volatile storage.

Figure 3:
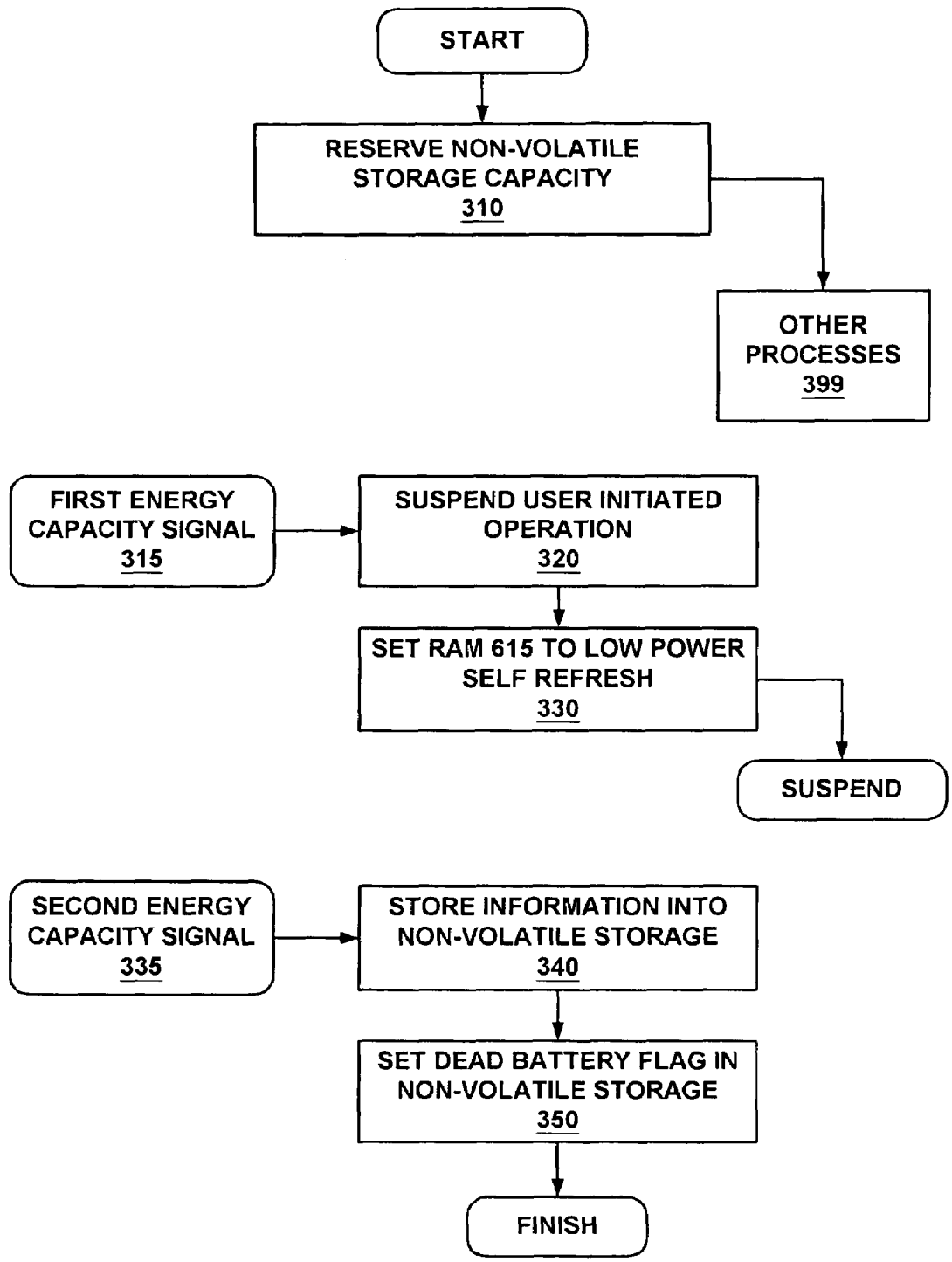
FIG. 3 is a flow diagram depicting a process 300 for storing information into non-volatile storage in response to an indication of an energy capacity, according to an embodiment of the present invention.

FIG. 3 is a flow diagram depicting a process 300 for storing information into non-volatile storage in response to an indication of an energy capacity, according to an embodiment of the present invention.

Other processes may typically operate between certain steps of process 300. In fact, process 300 may typically be reduced to practice in separate software modules. However, it is appreciated that process 300 is depicted generally without the various possible intervening processes in order to describe the present invention, and not unnecessarily obscure elements of the present invention.

In optional step 310, system 100 may reserve storage capacity in non-volatile storage. It is appreciated that this operation may take place at virtually any time in the system operation. For example, it may occur very early such as right after power on initialization. As another example, it may occur in response to the attachment of non-volatile storage to expansion interface 635.

After optional step 310 completes, process flow continues to other processes 399, which could be normal operation of the system 100, and are not the subject of the present invention.

Optional step 320 may begin in response to optional first energy capacity signal 315. Signal 315 may be generated by battery capacity monitor 680, and may be an interrupt signal. Optional suspend user initiated operation 320 may be an interrupt service routine.

In response to optional first energy capacity signal 315, optional suspend user initiated operation 320 may place system 100 in a low power mode. A specific operation may be to lock out the user from using the device, for example, by putting the system into a low power mode and ignoring button presses.

In step 330, the RAM 615 is set to low power self refresh mode. In this mode, the RAM (for example dynamic RAM) is commanded into its lowest power mode that will retain its contents.

All operations of processor 605 may then be suspended. All interrupts except for the battery capacity monitor 680 may be masked. System 100 may be configured such that only two events will end this suspended mode of operation. First, energy may be added to system 100, for example by recharging a battery. This may cause a power good or power on reset signal, which may begin the initialization of system 100 for normal operation.

Secondly, and as depicted in FIG. 3, energy may not be added to system 100, and suspend operations may continue to drain energy from the battery.

Still referring to FIG. 3, responsive to second energy capacity signal 335, step 340 may store information into non-volatile storage. Second energy capacity signal 335 may indicate that the battery contains less energy than indicated by optional first energy capacity signal 315.

Second energy capacity signal 335 may be an interrupt, and store information into non-volatile storage 340 may be an interrupt service routine.

After completion of step 340, option step 350 may store a dead battery flag in non-volatile storage, which may enable process 200 to act upon it at some point in the future.

The preferred embodiment of the present invention a system and method for information preservation on a portable electronic device is thus described. While the present invention has been described in particular embodiments, it should be appreciated that the present invention should not be construed as limited by such embodiments, but rather construed according to the below claims.

What is claimed is:

1. A method of preserving information in a portable electronic device, said method comprising:
   monitoring an energy capacity of a battery of said portable electronic device;
   suspending user-initiated operation of said portable electronic device based upon said energy capacity of said battery;
   in response to detecting said energy capacity has dropped below a predetermined energy capacity threshold, generating a signal associated with said energy capacity of said battery; and
   in response to said generating said signal, copying information from a volatile memory to a non-volatile memory communicatively coupled to said portable electronic device.

2. The method as described in claim 1, wherein said non-volatile memory is configured to store instructions for execution by a processor of said portable electronic device.

3. The method as described in claim 1, wherein said non-volatile memory is communicatively coupled to said portable electronic device via an expansion interface.

4. The method as described in claim 1, wherein said predetermined energy capacity threshold is associated with sufficient energy to complete said copying, and wherein said information comprises permanent information.

5. The method as described in claim 1, wherein said non-volatile memory comprises removable memory.

6. The method as described in claim 1 further comprising:
   generating said signal in response to removing a battery from said portable electronic device.

7. A method of preserving information in a portable electronic device, said method comprising:
   monitoring an energy capacity of a battery of said portable electronic device;
   in response to detecting said energy capacity has dropped below a first energy capacity threshold, suspending user-initiated operation of said portable electronic device;
   in response to said suspending, maintaining information in volatile memory in a low-power mode;
   in response to detecting said energy capacity has dropped below a second energy capacity threshold, generating a signal associated with said energy capacity of said battery; and
   in response to said generating, copying said information from said volatile memory to a non-volatile memory communicatively coupled to said portable electronic device.

8. The method as described in claim 7, wherein said non-volatile memory is configured to store instructions for execution by a processor of said portable electronic device.

9. The method as described in claim 7, wherein said non-volatile memory is communicatively coupled to said portable electronic device via an expansion interface.

10. The method as described in claim 7, wherein said second threshold is associated with a smaller amount of energy than said first threshold, and wherein said information comprises permanent information.

11. The method as described in claim 7, wherein said non-volatile memory comprises removable memory.

12. The method as described in claim 7, wherein said signal is generated in response to removing a battery from said portable electronic device.

13. A method of preserving information in a portable electronic device, said method comprising:
  reserving a first portion of a non-volatile memory communicatively coupled to said portable electronic device;
  monitoring an energy capacity of a battery of said portable electronic device;
  suspending user-initiated operation of said portable electronic device based upon said energy capacity of said battery;
  in response to detecting said energy capacity has dropped below an energy capacity threshold, generating a signal associated with said energy capacity of said battery; and
  in response to said generating, copying information from a volatile memory to said first portion of said non-volatile memory.

14. The method as described in claim 13, wherein said non-volatile memory is configured to store instructions for execution by a processor of said portable electronic device, and wherein said information comprises permanent information.

15. The method as described in claim 13, wherein said non-volatile memory is communicatively coupled to said portable electronic device via an expansion interface.

16. The method as described in claim 13, wherein said information comprises substantially all information of said volatile memory.

17. The method as described in claim 13, wherein a size of said first portion of said non-volatile memory is adjusted as a size of said information of stored in said volatile memory changes.

18. A method of preserving information in a portable electronic device, said method comprising:
  suspending user-initiated operation of said portable electronic device based upon said energy capacity of said battery;
  generating a signal to indicate an energy capacity of said battery has fallen below a predetermined energy capacity threshold;
  in response to said generating, copying information from a volatile memory to a non-volatile memory of said portable electronic device;
  in response to said copying, asserting an indicator flag associated with said energy capacity of said battery;
  supplying said portable electronic device with additional energy; and
  in response to detecting said indicator flag, restoring said information to said volatile memory of said portable electronic device.

19. The method according to claim 18, wherein said supplying comprises recharging a battery in said portable electronic device, and wherein said information comprises permanent information.

20. The method according to claim 18, wherein said supplying comprises replacing a battery in said portable electronic device.

21. The method according to claim 18 further comprising: clearing said indicator flag after said restoring.

22. A portable electronic device comprising:
  a battery;
  a processor;
  a non-volatile memory coupled to said processor;
  a volatile memory coupled to said processor, said volatile memory comprising information;
  a battery monitor for monitoring an energy capacity of said battery, said battery monitor further for generating a signal upon detecting that said energy capacity has dropped below a predetermined energy threshold; and
  wherein said processor is operable to suspend user-initiated operation of said portable electronic device based upon said energy capacity of said battery, and wherein said processor is further operable to initiate copying of said information from said volatile memory to said non-volatile memory in response to said generating.

23. The system as described in claim 22, wherein said processor is further operable to suspend user interaction with said portable device and place said portable electronic device in a low-power mode in response to detecting that said energy capacity of said battery has dropped below an additional energy capacity threshold, wherein said additional energy capacity threshold is associated with a larger amount of energy than said predetermined energy threshold.

24. The system as described in claim 22, wherein said non-volatile memory comprises removable memory.

25. The system of claim 22, wherein said information comprises permanent information.

* * * * *